United States Patent
Wang et al.

(10) Patent No.: US 8,311,561 B2
(45) Date of Patent: Nov. 13, 2012

(54) METHOD OF LOCATION POSITIONING AND VERIFICATION OF AN AP, SYSTEM, AND HOME REGISTER

(75) Inventors: Xiaolin Wang, Shenzhen (CN); Zhonghui Yao, Shenzhen (CN); Ning Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 12/555,632

(22) Filed: Sep. 8, 2009

(65) Prior Publication Data

US 2010/0062791 A1    Mar. 11, 2010

(30) Foreign Application Priority Data

Sep. 8, 2008 (CN) .......................... 2008 1 0216125

(51) Int. Cl.
*H04W 24/00* (2009.01)
(52) U.S. Cl. ................ 455/456.6; 455/456.2; 455/456.1
(58) Field of Classification Search ....... 455/456.1–457, 455/404.2; 340/539.13
See application file for complete search history.

(56) References Cited

U.S. PATENT DOCUMENTS

| | | | |
|---|---|---|---|
| 2004/0157625 A1 | 8/2004 | Gheorghiu et al. | |
| 2005/0136941 A1 | 6/2005 | Asho et al. | |
| 2008/0285544 A1* | 11/2008 | Qiu et al. | 370/352 |
| 2009/0196253 A1* | 8/2009 | Semper | 370/331 |

FOREIGN PATENT DOCUMENTS

| | | |
|---|---|---|
| CN | 1863111 | 11/2006 |
| CN | 1863111 A | 11/2006 |
| CN | 101043415 A | 9/2007 |
| CN | 101674566 B | 4/2012 |
| EP | 1906588 A1 | 4/2008 |
| WO | 2007140674 A1 | 12/2007 |
| WO | 2008/047140 | 4/2008 |
| WO | 2008047140 A1 | 4/2008 |

OTHER PUBLICATIONS

Office Action, mailed Mar. 23, 2011, in Chinese Application No. 200810216125.2 (19 pp.).

(Continued)

*Primary Examiner* — Patrick Edouard
*Assistant Examiner* — Ronald Eisner
(74) *Attorney, Agent, or Firm* — Staas & Halsey LLP

(57) ABSTRACT

A method of location positioning of a Radio Access Point (AP) is provided in an embodiment of the present invention. The method includes: querying the Connectivity Session Location and Repository Function (CLF) according to the IP address of the AP to obtain the Access Line Location Identifier (ALLI) of the AP to access a network. The ALLI is configured to identify the line location of the AP. The location of the AP is determined on the basis of the ALLI. A method of location verification of an AP is provided herein in an embodiment of the present invention. The method includes: the CLF is queried according to the IP address of the AP to obtain the ALLI of the AP; the location of the AP is not changed if the obtained ALLI of the AP is the same as the stored ALLI of the AP. A home register and a system are also provided herein to accurately locate and verify the location of the AP, thus checking the validity of the AP location.

18 Claims, 15 Drawing Sheets

---

A request message with the IP address of the public network of the AP is received — S100

The CLF is queried according to the IP address of the AP to obtain the ALLI of the AP to access the Internet — S101

The location of the AP is determined based on the ALLI — S102

OTHER PUBLICATIONS

ETSI, *NGN Functional Architecture; Network Attachment Subsystem; Realease 1*, V1.0.0, Sep. 2005 (pp. 1-34).

HUAWEI, *Iu-based 3G HNB Architecture*, 3GPP TSG RAN WG3 Meeting #60, May 2008 (pp. 1-9).

3GPP, *3rd Generation Partnership Project; Technical Specification Group Service and System Aspects; Security pf H(e) NB; (Release 8)*, V0.3.0, Jul. 2008 (pp. 1-35).

Extended European Search Report, mailed Jan. 13, 2010, in corresponding European Application No. 09169753.2 (9 pp.).

3GPP, *Generation Partnership Project; Technical Specification Group Service and System Aspects; Security of H(e)NB; (Release 8)*, V2.0.0, Mar. 2009 (pp. 1-75).

\* cited by examiner

METHOD OF LOCATION POSITIONING AND VERIFICATION OF AN AP, SYSTEM, AND HOME REGISTER

CROSS-REFERENCE TO RELATED APPLICATIONS

This application claims priority to Chinese Patent Application No. 200810216125.2, filed on Sep. 8, 2008, which are hereby incorporated by reference in its entirety.

FIELD OF THE INVENTION

The present disclosure relates to a mobile telecommunication technology field, and in particular, to a method of location positioning and verification of an AP, a system, and a home register.

BACKGROUND

Femtocell is an AP that is promoted for homes and small-and-medium-sized enterprises to fast solve the indoor coverage problem. Usually, Femtocell is also called 3G AP, or home BTS. In the Universal Mobile Telecommunications System (UMTS), Femtocell is called Home Node-B (HNB). In the 3rd Generation Partnership Project (3GPP) during Long Term Evolution (LTE), Femtocell is called Home eNode-B (HeNB). In general, Femtocell is a low-cost and low-power AP that implements the communication between an IP network and a mobile network over existing wideband circuits or a specific secure gateway remotely.

In a traditional BTS covering a large area, network nodes are often planned and deployed by operators. Therefore, the time, place, and configuration of a BTS to connect to the network are known to the current radio network. To connect a BTS to the network, the relevant access parameters are configured on the basis of network planning data. No special control mechanism is required.

The Femtocell features small and light, and can be installed easily and directly in users' homes or small and medium-sized enterprises. In the process of implementing the embodiment of the present invention, the inventor, however, discovers that the technology at least has the following disadvantages: A user can move the Femtocell to another location freely. However, the Femtocell device is generally provided by operators as network service providers to the user for free. The user enjoys only the right to use the device, which is still owned by the operators. The operators need to control the location where the subscriber uses the device, and do not want the user to move the device freely without the authorization of operators. Therefore, the location of the Femtocell must be authorized to ensure the validity of the location when relevant services are provided.

SUMMARY

Embodiments of the present disclosure provide a method of location positioning and location verification of an AP, a system, and a home register, to accurately locate and verify the location of the AP, thus checking the validity of the AP location.

A method of location positioning of an AP is provided in the present invention. The method includes:

Querying, a Connectivity Session Location and Repository Function, CLF, according to an IP address of the AP to obtain an access Line Location Identifier, ALLI of the AP; and determining a location of the AP based on the ALLI.

A method of location verification of an AP is also provided in the present invention. The method includes:

querying, according to an IP address of the AP, a Connectivity Session Location and Repository Function, CLF to obtain an access Line Location Identifier, ALLI of the AP; and determining that the location of the AP is not changed if the obtained ALLI of the AP is the same as a stored ALLI of the AP.

A method of location verification of an AP is also provided in the present invention. The method includes:

receiving a message carrying an IP address of the AP which is located in the coverage of a macro cell and the location information of the macro cell;

querying, according to the IP address of the AP, a Connectivity Session Location and Repository Function, CLF to obtain an access Line Location Identifier, ALLI of the AP; and determining, that the location of the AP is not changed if the obtained ALLI of the AP is the same with the stored ALLI of the AP, and the received location information of the macro cell is the same with the stored location information of the macro cell.

An AP Home Register (AHR) is also provided in the present invention to verify the location of the AP. The home register includes:

a querying module, configured to query, according to an IP address of the AP, a Connectivity Session Location and Repository Function, CLF to obtain an access Line Location Identifier, ALLI of the AP; and a location positioning module, configured to: determine the location of the AP based on the ALLI.

An AHR is also provided in the present invention. The home register includes:

a querying module, configured to query, according to an IP address of the AP, a Connectivity Session Location and Repository Function, CLF to obtain an access Line Location Identifier, ALLI of the AP;

a determining module, configured to determine whether the obtained ALLI of the AP is the same as a stored ALLI of the AP; and a sending module, configured to send the result that the location of the AP is not changed, to the AP if the determining module determines that the obtained ALLI is the same as the stored ALLI.

An AHR is also provided in the present invention. The home register includes:

a receiving module, configured to receive a message carrying an IP address of the AP which is located in the coverage of a macro cell, and location information of the macro cell:

a querying module, configured to query, according to the IP address of the AP, a Connectivity Session Location and Repository Function, CLF to obtain an access Line Location Identifier, ALLI of the AP;

a determining module, configured to determine whether the obtained ALLI of the AP is the same as the stored ALLI of the AP, and whether the location information of the macro cell is the same as the stored location information of the macro cell; and a sending module, configured to return the result that the location of the AP is not changed, to the AP if the determining module determines that the obtained ALLI is the same as the stored ALLI and the received location information is the same as the stored location information.

A location verification system is provided in the present invention. The system includes an AP, a network communication device, a Security Gateway (SeGW), an Access Gateway (AG), an AHR, and a CLF. the AP is connected communicatively to the SeGW through the network communication device, the SeGW is connected communicatively to the AHR through the AG, The AHR is connected communicatively to the CLF. The AHR is configured to query, according to an IP address of the AP, the CLF to obtain an access Line Location Identifier, ALLI of the AP, and determine a location of the AP based on the ALLI.

A location verification system is provided in the present invention. The location verification system includes an AP, a network communication device, a SeGW, an AG, an AHR, and a CLF. the AP is connected communicatively to the SeGW through the network communication device, the SeGW is connected communicatively to the AHR through the AG, The AHR is connected communicatively to the CLF. The AHR is configured to query, according to an IP address of the AP, the CLF to obtain an access Line Location Identifier, ALLI of the AP, and determine whether the obtained ALLI of the AP is the same as a stored ALLI of the AP, and return the result that the location of the AP is not changed, to the AP if the obtained ALLI of the AP is the same as a stored ALLI of the AP.

A location verification system is provided in the present invention. The system includes an AP, a network communication device, a SeGW, an AG, an AHR, and a CLF. the AP is connected communicatively to the SeGW through the network communication device, the SeGW is connected communicatively to the AHR through the AG, The AHR is connected communicatively to the CLF. The AHR is configured to query, according to an IP address carried in a received message, the CLF to obtain an access Line Location Identifier, ALLI of the AP which is located in the coverage of a macro cell, and determine whether the obtained ALLI of the AP is the same as the stored ALLI of the AP, and the location information of the macro cell carried in the received message is the same as stored location information of the macro cell, and return the result that the location of the AP is not changed, to the AP if the obtained ALLI of the AP is the same as the stored ALLI of the AP, and the received location information of the macro cell is the same as the stored location information of the macro cell.

The preceding location positioning and verification methods, the system, and the server are configured to bind the AP with the ALLI of the AP to access the network and store the ALLI. Because the ALLI remains unchanged, the location of the AP to access the Internet can be located by obtaining the ALLI. In addition, the location of the AP can be verified accurately by determining whether the ALLI related to the IP address of the public network of the AP is the same as the stored ALLI of the AP, thus checking the validity of the AP location.

BRIEF DESCRIPTION OF THE DRAWINGS

To explicitly explain the embodiment of the present invention or the solution by using the existing technology, the figures in this embodiment or the existing technical descriptions are described as follows. Obviously, the following figures illustrate embodiments of the present invention, based on which other figures can be obtained by those skilled in the art without creative work.

DETAILED DESCRIPTION

The following section explicitly describes the complete technical solution provided in the embodiments of the present invention. Obviously, only parts of the embodiments of the present invention are involved herein. All the other embodiments obtained by those skilled in the art without creative work based on the embodiments of the present invention are protected by the present invention.

Figure 1:
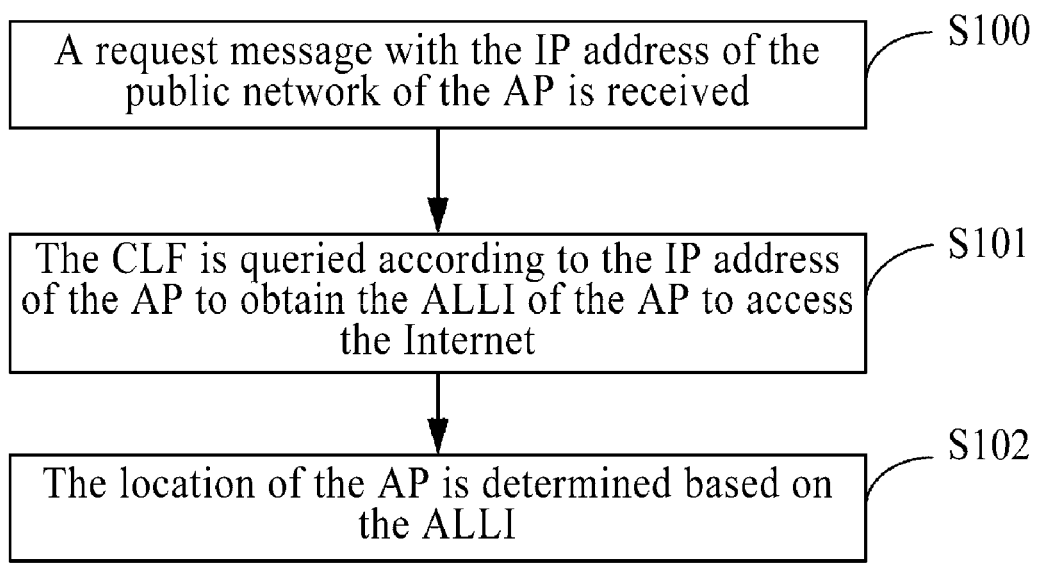
FIG. 1 is a flowchart of a location positioning method of an AP provided in an embodiment of the present invention.

FIG. 1 is a flowchart of a location positioning method of an AP in an embodiment of the present invention.

The AP is Femtocell in the embodiment of the present invention.

S100: The request message with the IP address of the public network of the AP is received. Two scenarios are covered in the embodiment of the present invention: In the first scenario, a boot flow request message with the IP address of the AP is received; in the second scenario, an access flow request message with the IP address of the AP is received.

S101: The CLF is queried according to the IP address of the AP to obtain an ALLI of the AP to access the Internet. The ALLI is configured to identify the line location of the AP to access the network. In the embodiment of the present invention, the line location of the AP to access the network is identified by a DSLAM port number or a telephone number when the AP is connected to the network.

S102: The location of the AP is determined based on the ALLI.

A method of location of the AP is provided in the embodiment of the present invention. Because the ALLI keeps unchanged, the location of the AP to access the Internet can be located by obtaining the ALLI.

Figure 2:
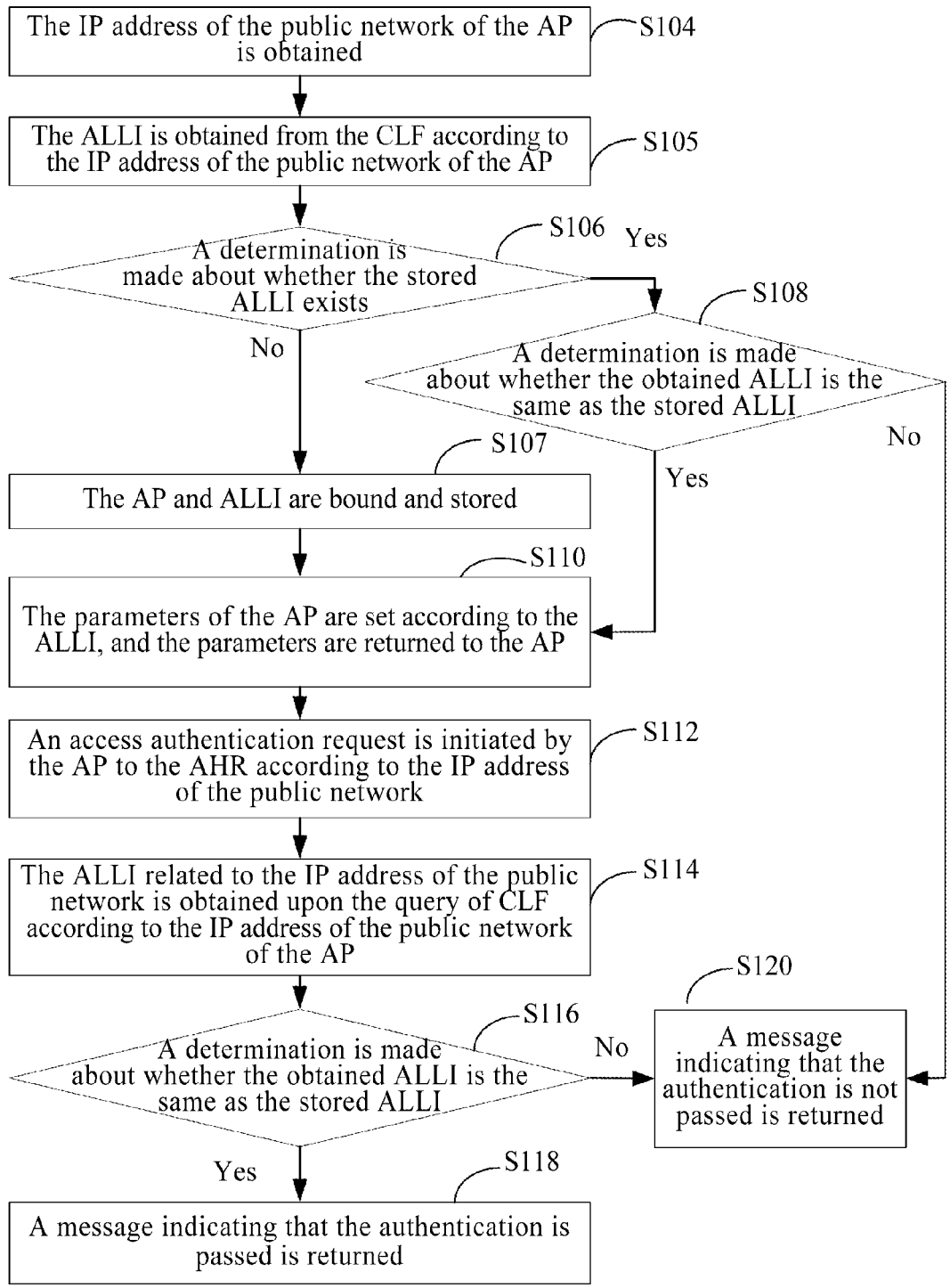
FIG. 2 is a general flowchart of a location verification method of an AP provided in embodiment 1 of the present invention.

FIG. 2 is a general flowchart of the location verification method of an AP provided in embodiment 1 of the present invention. The AP is Femtocell in the embodiment of the present invention.

S104: The IP address of the public network of the AP is obtained.

S105: The CLF is queried according to the IP address of the public network of the AP to obtain the ALLI of the AP to access the Internet. The ALLI is configured to identify the line location of the AP to access the network. In the embodiment of the present invention, the line location of the AP to access the network is identified by a DSLAM port number or a telephone number when the AP is connected to the network.

S106: A determination is made about whether the stored ALLI of the AP exists. In this case, the stored ALLI is the preset stored ALLI of the AP.

If the stored ALLI is not preset, the process proceeds to S107. If the stored ALLI is preset, the process proceeds to S108 to determine whether the obtained ALLI of the AP to access the Internet is the same as the preset ALLI of the AP.

If the obtained ALLI is the same as the preset ALLI, the process proceeds to S110. Otherwise, the process proceeds to S120.

S107: The obtained ALLI of the AP is bound and stored.

S110: The parameters of the AP are configured according to the ALLI and then returned to the AP.

S112: The access authentication is performed according to the IP address of the public network carried by the AP.

S114: The CLF is queried again according to the IP address of the public network carried by the AP to obtain the ALLI of the AP to access the Internet.

S116: A determination is made about whether the obtained ALLI of the AP to access the Internet is the same as the stored ALLI. In this case, the stored ALLI is the stored ALLI in S107.

If the obtained ALLI is the same as the stored ALLI, the process proceeds to S118, and a message indicating that the authentication is passed, that is, the location of the AP is not changed, to the AP. Otherwise, the process proceeds to S120, and a message indicating that the authentication is not passed, that is, the location of the AP is changed, to the AP.

Figure 3:
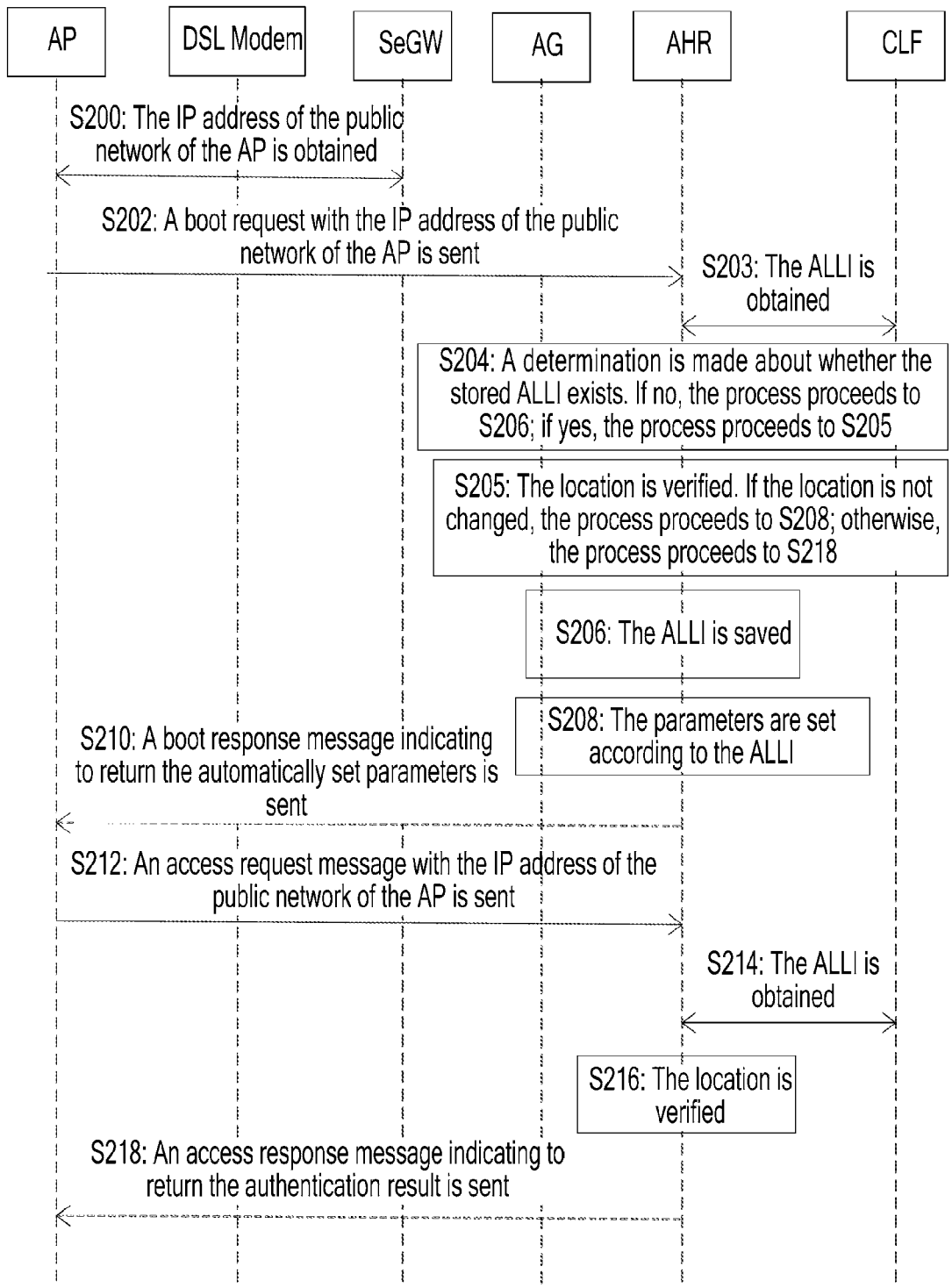
FIG. 3 is a flowchart of a specific application in the first scenario in the general flowchart shown in FIG. 2.

FIG. 3 is a flowchart of specific application in the first scenario in the general flowchart shown in FIG. 2. In the embodiment of the present invention, the location verification method of the AP is applied to the networking architecture where the AP, a network communication device, a SeGW, an AG, an AHR, and a CLF are contained. The network communication device can be an XDSL modem.

S200: An IPSec tunnel is established upon the negotiation between the SeGW and AP to obtain the IP address of the public network of the AP to access the Internet. In the embodiment of the present invention, an IPSec tunnel is established on the negotiation between the AP and the SeGW over IKEv2 protocol, and the IP address of the public network of the AP to access the Internet through the network communication device over IKEv2 protocol, that is, the SeGW extracts the source IP address from the IP header in the message sent by the AP and then returns the source IP address to the AP. In the embodiment of the present invention, if the network communication device is connected to the Internet in NAT mode, the source IP address is the IP address of the public network of the network communication device. Otherwise, the source IP address is the IP address of the public network of the AP. In the embodiment of the present invention, the SeGW can return the source IP address to the AP in the mode of carrying extendably the IP address in the vendor ID payload or the configuration payload.

S202: The AP sends a boot flow request message with the obtained IP address of the public network to the AG, and then the AG forwards the IP address to the AHR.

S203: The AHR queries the CLF according to the received IP address of the public network to obtain the ALLI of the AP to access the Internet.

S204: A determination is made about whether the ALLI of the AP is stored in the AHR. In this case, the stored ALLI is the preset stored ALLI of the AP. If the ALLI of the AP is not stored in the AHR, the process proceeds to S206. If the ALLI is stored in the AHR, the process proceeds to S205 to determine whether the obtained ALLI of the AP to access the Internet is the same as the stored ALLI, that is, the location is verified. If the obtained ALLI is the same as the stored ALLI, the process proceeds to S208. Otherwise, the process proceeds to S218, in which the AHR returns the result indicating that the authentication is not passed, that is, the location of the AP is changed, to the AP. Therefore, the AP stops its running.

S206: The AHR binds the obtained ALLI of the AP to access the Internet with information of the AP and stores the ALLI. In the embodiment of the present invention, the AHR can bind the ALLI with information of the AP according to the production serial number or MAC address of the AP.

S208: The AHR sets the parameters of the AP according to the ALLI. In the embodiment of the present invention, the following parameters are included: AP information, IP address of the APM, SGW information, AG information, and the IP address of CLK server. The AP information includes: AP index, maximum number of users, scope of the local SCTP port number of the AP, PLMN indication content, SMS content, user admission policy, user admission list (including the MSISDN and IMSI) in non-all-directional opening mode, whether to report the location information of LCS, latitude and longitude. The SGW information includes whether to build the list of Ipsec and SGW. Each SGW list includes the following information: IP address of SGW, IP network segment address of the core network, length of the IP network segment address mask of the core network, SGW IKE ID. The AG information includes: scope of the local SCTP port number of AG and AG list.

S210: The AHR returns the set parameters to the AP through a boot flow response message.

S212: The AP sends an access flow request message with the IP address of the public network of the AP to the AHR for access authentication.

S214: The AHR queries the CLF again according to the IP address of the public network sent by the AP to obtain the ALLI of the AP to access the Internet.

S216: The AHR determines whether the ALLI, which is obtained from the CLF, of the AP to access the Internet is the same as the stored ALLI of the AP to access the Internet, that is, the location is verified. In this case, the stored ALLI of the AP is the stored ALLI in S206.

S218: The AHR returns the authentication result to the AP through an access flow response message, that is, the location of the AP is not changed. In the embodiment of the present invention, if the AHR returns the result indicating that the authentication is passed to the AP, the AP runs continuously. If the AHR returns the result indicating that the authentication is not passed to the AP, that is, the location of the AP is changed, the AP stops its running.

A method of location verification of the AP is provided in the embodiment of the present invention to bind the AP with the ALLI of the AP to access the Internet and store the ALLI. Because the ALLI keeps unchanged, the location of the AP can be verified accurately by determining whether the ALLI related to the IP address of the public network of the AP is the same as the stored ALLI of the AP, thus checking the validity of the AP location. When the location of the AP is changed, the AP is prohibited to access the network, that is, the authentication is not passed, so that a user is restricted to move the AP freely.

Figure 4:
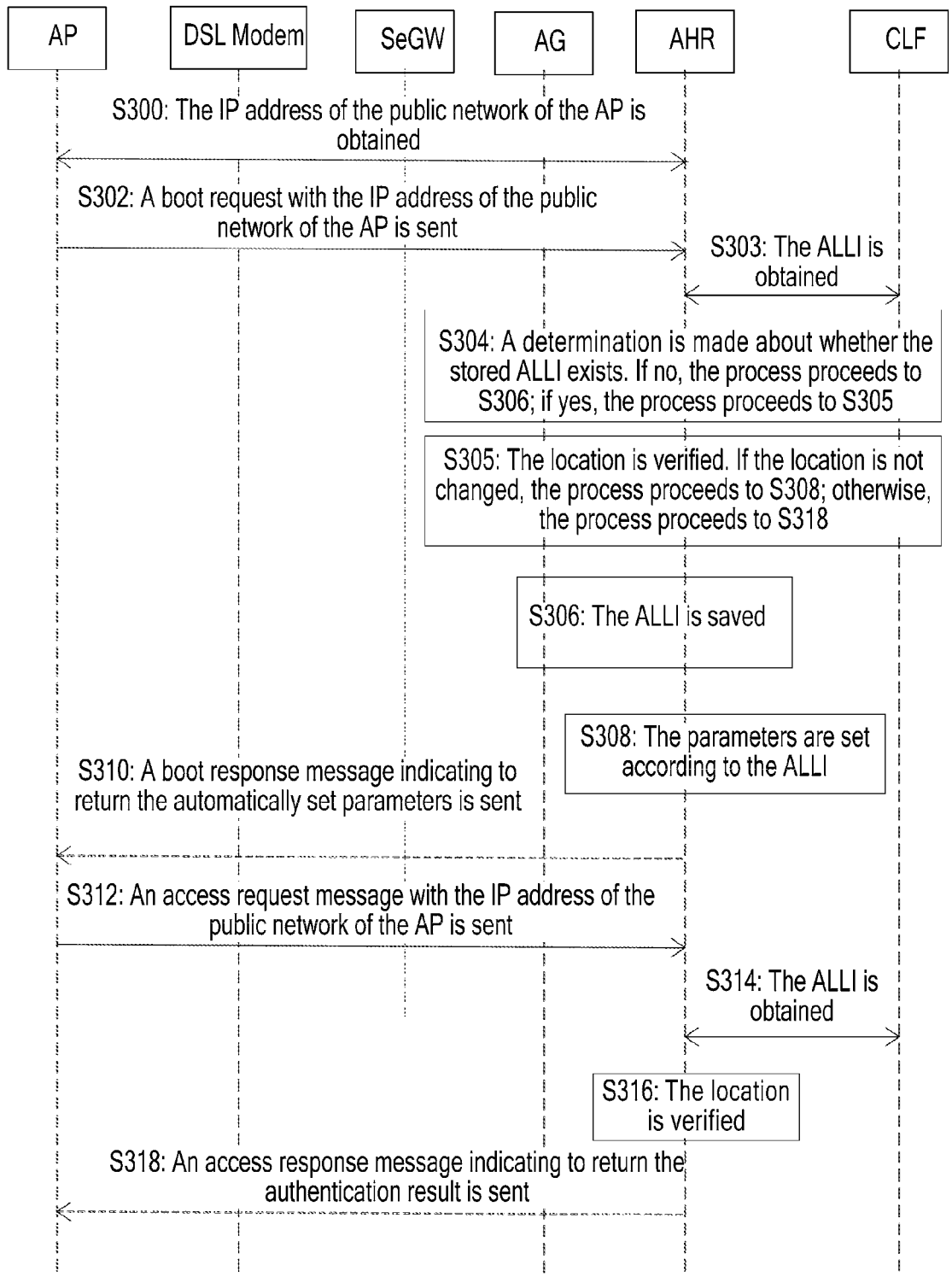
FIG. 4 is a flowchart of a specific application in the second scenario in the general flowchart shown in FIG. 2.

FIG. 4 is a flowchart of specific application in the second scenario in the general flowchart shown in FIG. 2. The difference between FIG. 4 and FIG. 3 lies in the method for obtaining the IP address of the public network of the AP.

S300: An IPSec tunnel is established upon the negotiation of the SeGW and the AP. After the SeGW obtains the IP address of the public network of the AP to access the Internet through a network communication device, that is, the SeGW extracts the source IP address from the IP header in the message sent by the AP, the SeGW sends the IP address to the AHR by sending an EAP-SIM or EAP-AKA authentication message. Then, the AHR returns the IP address to the AP.

S302 to S318 are the same as S202 to S218 in FIG. 3.

Figure 5:
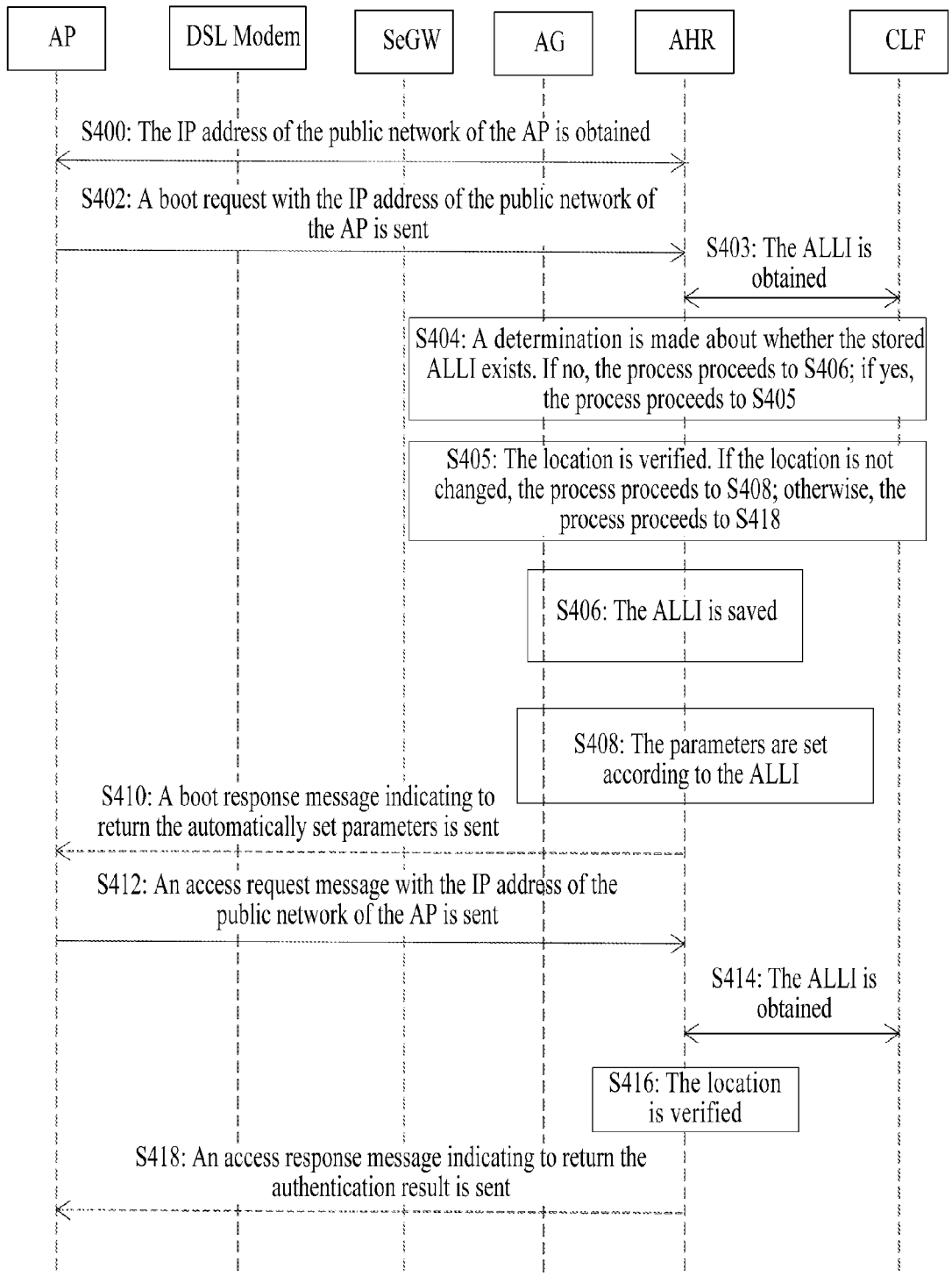
FIG. 5 is a flowchart of a specific application in the third scenario in the general flowchart shown in FIG. 2.

FIG. 5 is a flowchart of specific application in the third scenario in the general flowchart shown in FIG. 2. The difference between FIG. 5, FIG. 4, and FIG. 3 lies in the method for obtaining the IP address of the public network of the AP.

S400: An IPSec tunnel is established upon the negotiation of the SeGW and the AP. After the SeGW obtains the IP address of the public network of the AP 1 to access the Internet through the network communication device 2, that is, the SeGW extracts the source IP address from the IP header in the message sent by the AP, the SeGW sends the IP address to the AHR by sending a DHCP request message for allocating the IP address of the Intranet to the AHR. Then, the AHR returns the IP address to the AP.

S402 to S418 are the same as S202 to S218 in FIG. 3.

A method of location verification of the AP is provided in the embodiment of the present invention to bind the AP with the ALLI of the AP to access the Internet and store the ALLI. Because the ALLI keeps unchanged, the location of the AP can be verified accurately by determining whether the ALLI related to the IP address of the public network of the AP is the same as the stored ALLI of the AP, thus checking the validity of the AP location.

Figure 6A:
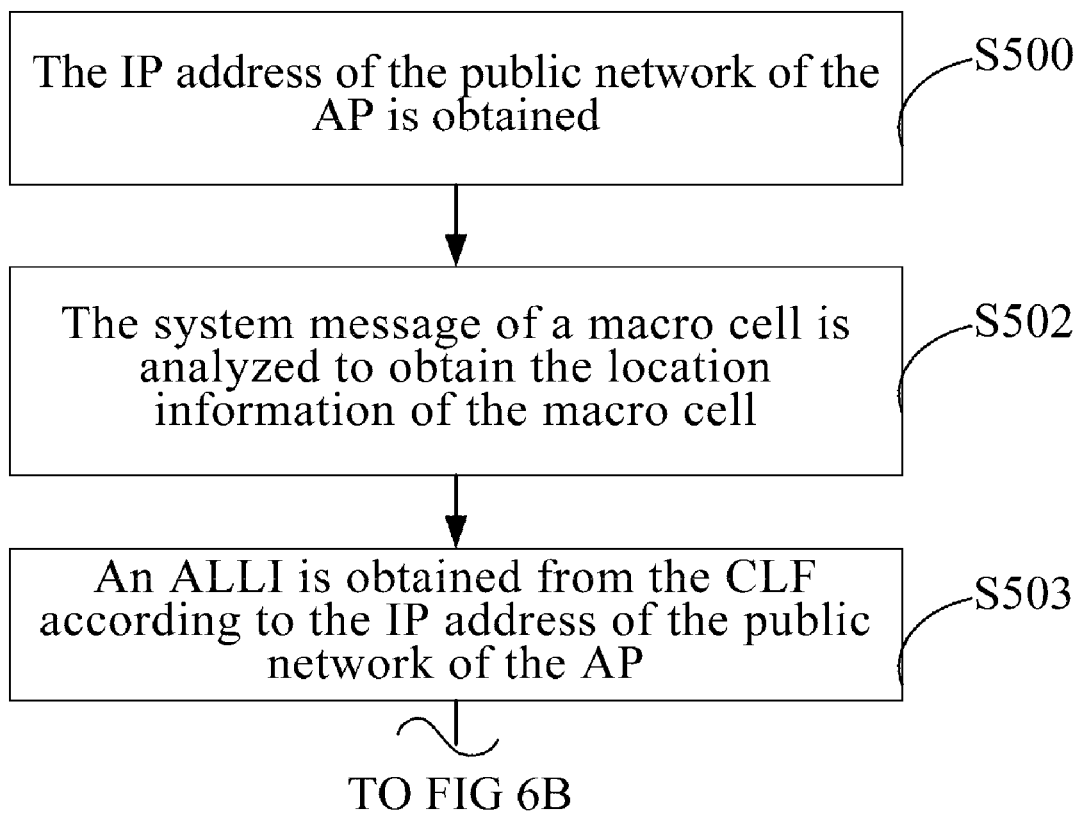
FIGS. 6A-6C are a general flowchart of a location verification method of an AP provided in embodiment 2 of the present invention.
Figure 6B:
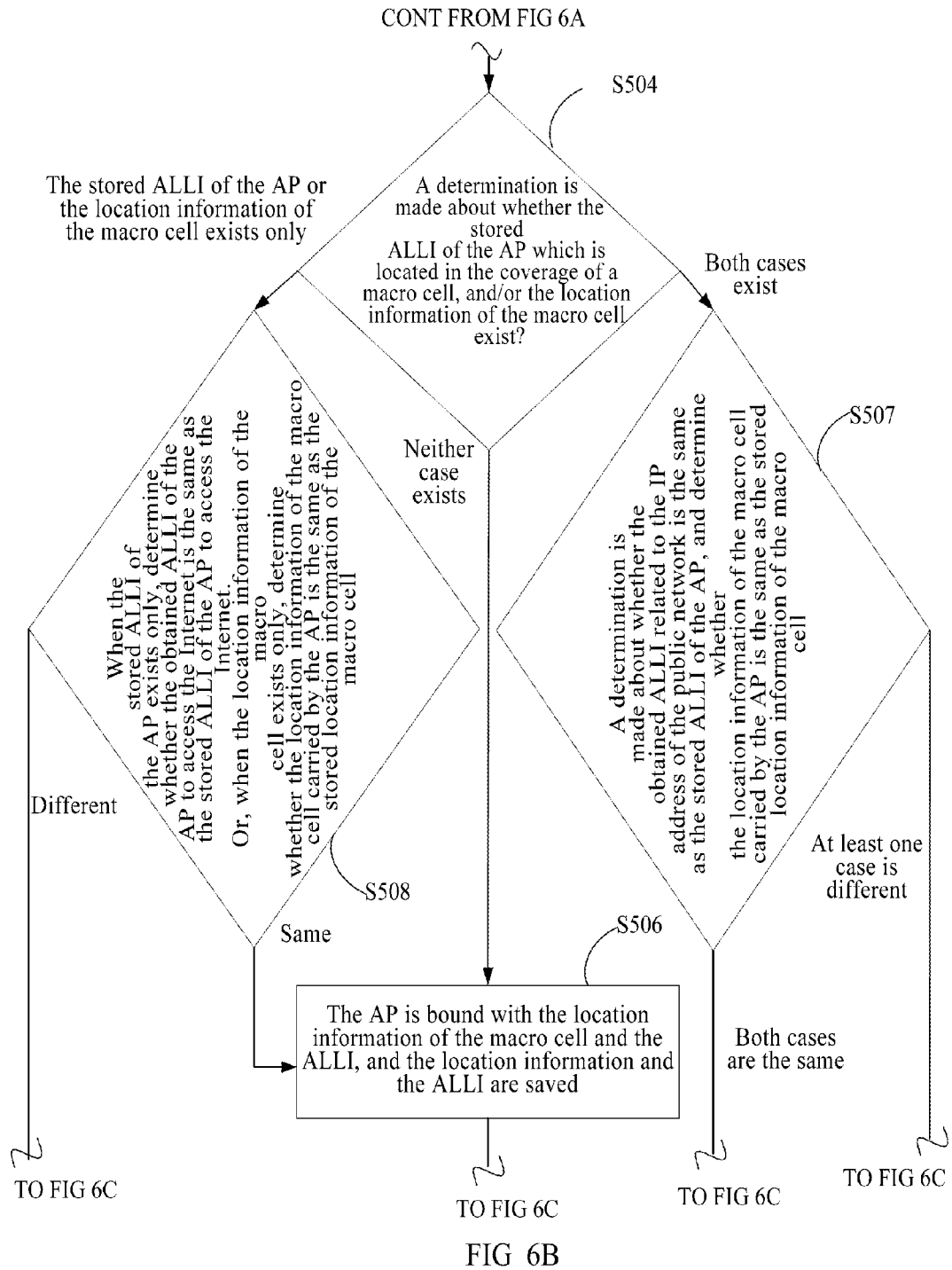
Figure 6C:
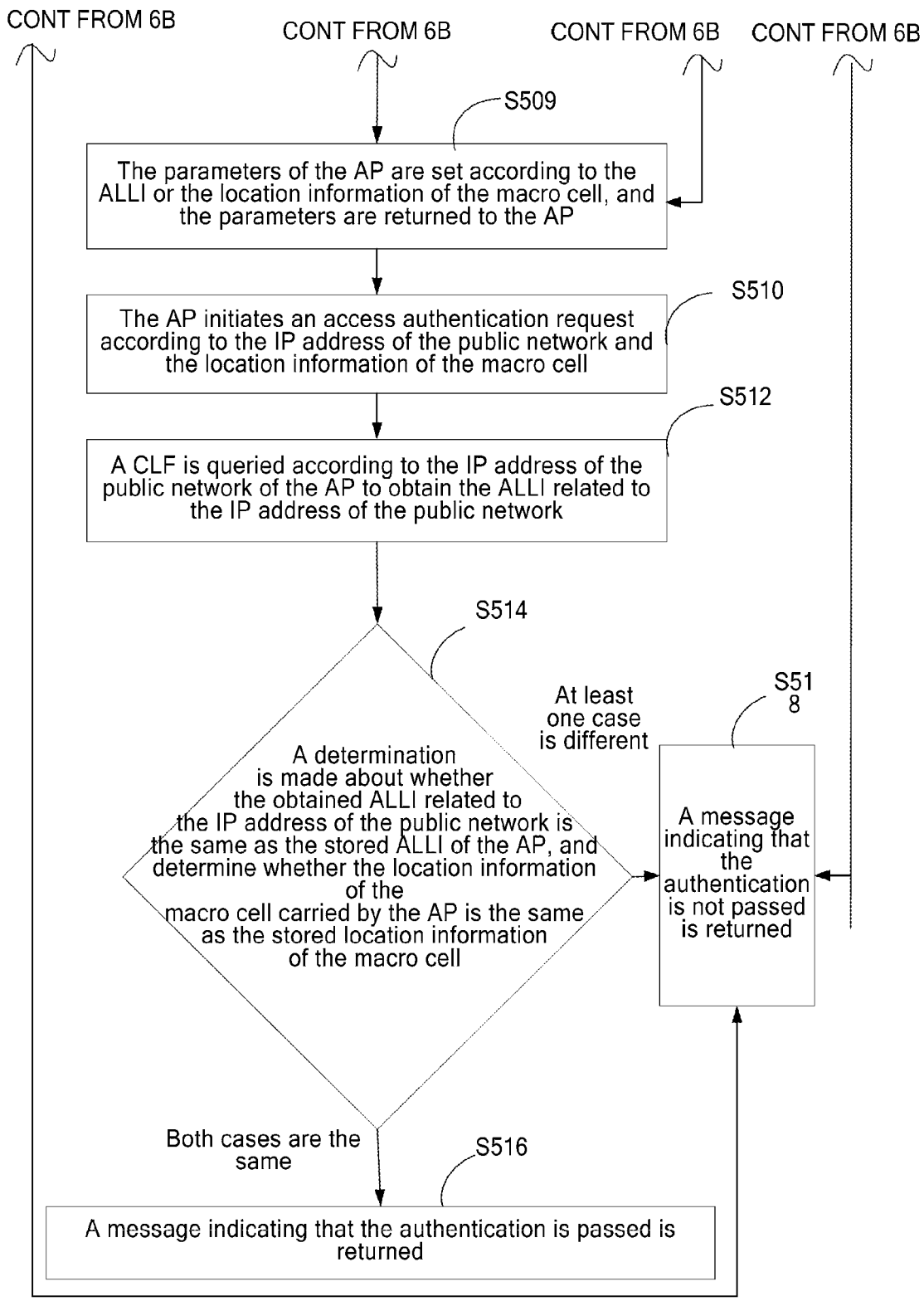

FIGS. 6A-6C are a general flowchart of the location verification method of an AP provided in embodiment 2 of the present invention.

S500: The IP address of the public network of the AP, which is located in the coverage of a macro cell, is obtained.

S502: The system message of a macro cell is analyzed to obtain the location information of the macro cell. In the embodiment of the present invention, the AP serves as a micro NodeB. Multiple micro NodeBs can be covered in the scope of a macro cell. The location information includes the Public Land Mobile-communication Network identification (PLMN ID) of the macro cell, Local Area Identity (LAI), and cell ID.

S503: The CLF is queried according to the IP address of the public network of the AP to obtain the ALLI of the AP to access the Internet.

S504: A determination is made about whether the stored ALLI of the AP which is located in the coverage of a macro cell and/or the location information of the macro cell exist. In this case, the stored ALLI of the AP is the preset stored ALLI of the AP, and the stored location information of the macro cell is the preset stored location information of the macro cell.

If neither the stored ALLI of the AP nor the location information of the macro cell exists, the process proceeds to S506.

In the embodiment of the present invention, if both the stored ALLI of the AP which is located in the coverage of a macro cell, and the location information of the macro cell exist, the process proceeds to S507 to determine whether the stored ALLI of the AP to access the Internet is the same as the stored ALLI of the AP to access the Internet, and to determine whether the location information of the macro cell carried by the AP is the same as the stored location information of the macro cell. If the obtained ALLI is the same as the stored ALLI and the carried location information of the macro cell is the same as the stored location information of the macro cell, the process proceeds to S509. If at least one preceding case is different, the process proceeds to S518, and a message indicating that the authentication is not passed is returned to the AP. In the embodiment of the present invention, a different case refers to:

The obtained ALLI is different from the stored ALLI and the carried location information of the macro cell is the same as the stored location information of the macro cell;

the obtained ALLI is the same as the stored ALLI and the carried location information of the macro cell is different from the stored location information of the macro cell; or the obtained ALLI is different from the stored ALLI and the carried location information of the macro cell is different from the stored location information of the macro cell.

In the embodiment of the present invention, the S508 is preceded. When the stored ALLI of the AP, which is located in the coverage of a macro cell, exists only, a determination is made about whether the obtained ALLI of the AP to access the Internet is the same as the stored ALLI of the AP to access the Internet. If the obtained ALLI is the same as the stored ALLI, the process proceeds to S506.

Or, in S508, when the location information of the macro cell exists only, a determination is made about whether the location information of the macro cell carried by the AP is the same as the stored location information of the macro cell. If the carried location information is the same as the stored location information, the process proceeds to S506. If the obtained ALLI is different from the stored ALLI, or the carried location information of the macro cell is different from the stored location information of the macro cell, the process proceeds to S518.

S506: The AP is bound with the location information of the macro cell and the obtained ALLI, and the location information and the ALLI are stored.

S509: The parameters of the AP are set according to the ALLI or the location information of the macro cell, and the parameters are returned to the AP.

S510: The access authentication is performed according to the IP address of the public network carried by the AP and the location information of the macro cell.

S512: The CLF is queried again according to the IP address of the public network carried by the AP to obtain the ALLI of the AP to access the Internet.

S514: A determination is made about whether the obtained ALLI of the AP to access the Internet is the same as the stored ALLI of the AP to access the Internet, and whether the location information of the macro cell carried by the AP is the same as the stored location information of the macro cell, that is, the location is verified.

If the obtained ALLI is the same as the stored ALLI and the carried location information of the macro cell is the same as the stored location information of the macro cell, that is, the location of the AP is not changed, the process proceeds to S516, and a message indicating that the authentication is passed is returned to the AP. If at least one preceding case is different, that is, the location of the AP is changed, the process proceeds to S518, and a message indicating that the authentication is not passed is returned to the AP. In the embodiment of the present invention, a different case refers to:

The obtained ALLI is different from the stored ALLI and the carried location information of the macro cell is the same as the stored location information of the macro cell;

the obtained ALLI is the same as the stored ALLI and the carried location information of the macro cell is different from the stored location information of the macro cell; or the obtained ALLI is different from the stored ALLI and the carried location information of the macro cell is different from the stored location information of the macro cell.

Figure 7A:
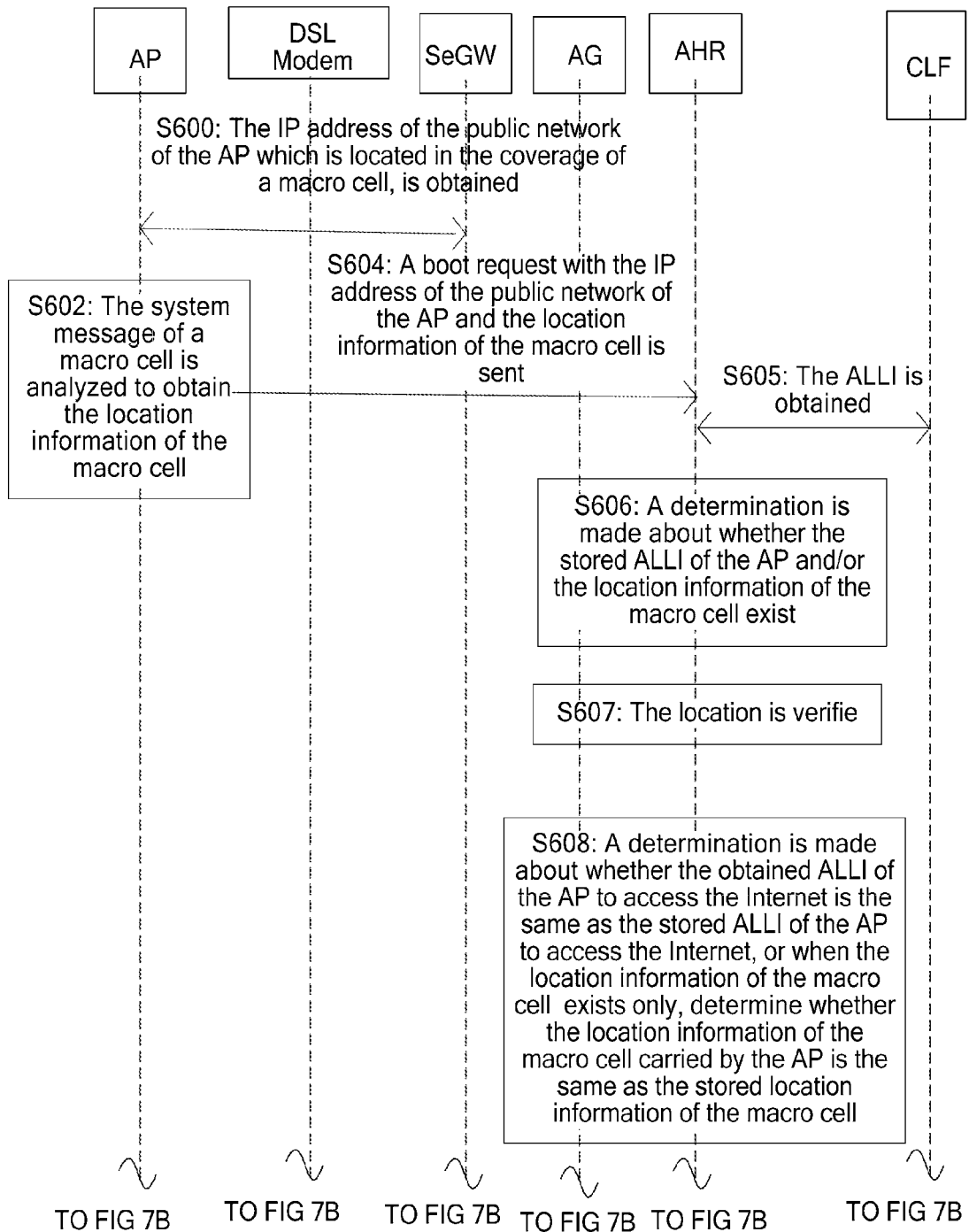
FIGS. 7A-7B are a flowchart of a specific application in the first scenario in the general flowchart shown in FIGS. 6A-6C.
Figure 7B:
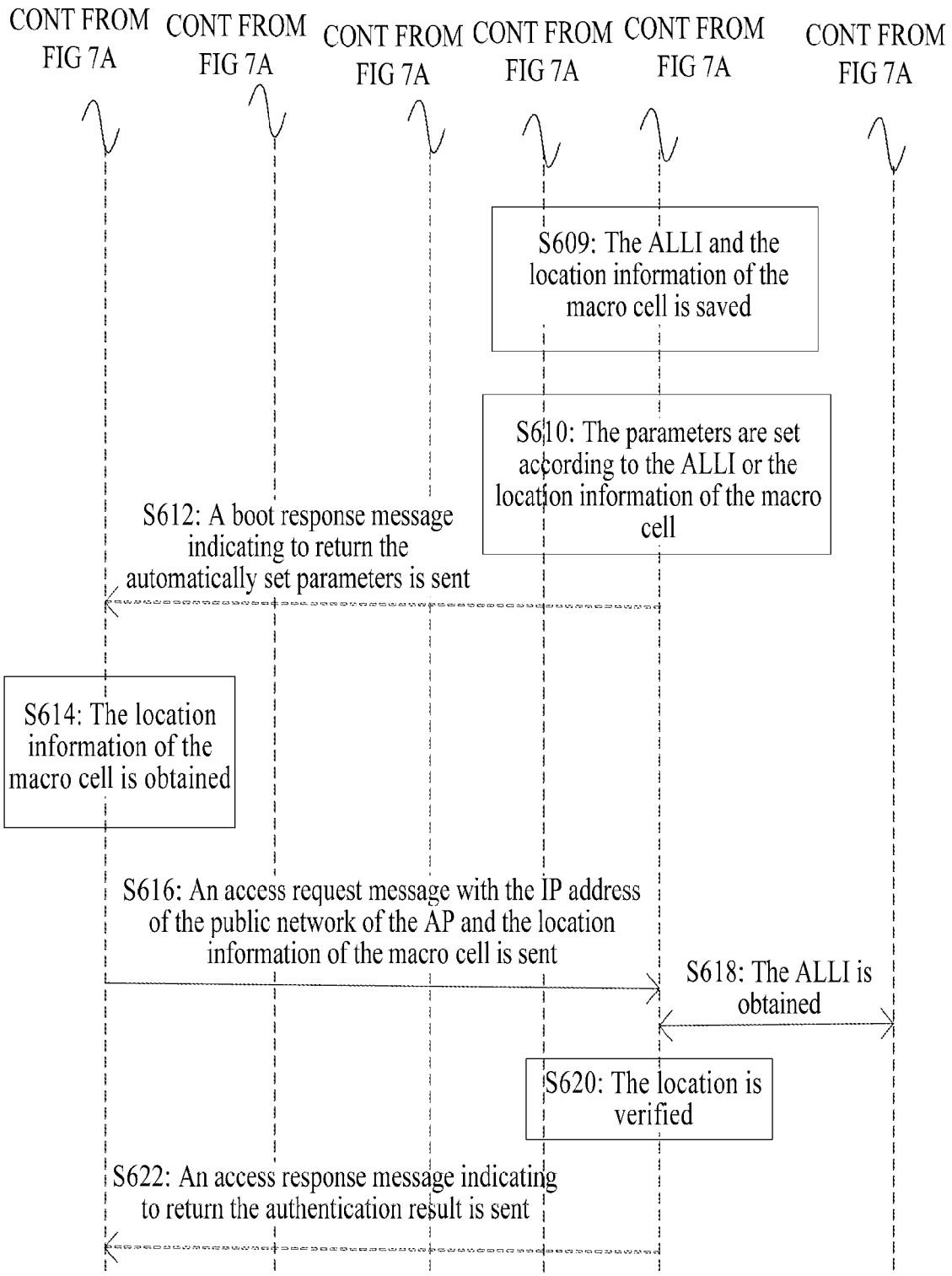

FIGS. 7A-7B are a flowchart of specific application in the first scenario in the general flowchart shown in FIGS. 6A-6C.

In the embodiment of the present invention, same as S200 in FIG. 3, S600 is proceeded to obtain the IP address of the public network of the AP which is located in the coverage of a macro cell in the same way.

S602: The AP analyzes the system message of the macro cell to obtain the location information of the macro cell.

S604: The AP sends a boot flow request message with the obtained IP address of the public network and the location information of the macro cell to the AG, and then the AG forwards the IP address and location information to the AHR.

S605: The AHR queries the CLF according to the received IP address of the public network to obtain the ALLI of the AP to access the Internet.

S606: A determination is made about whether the stored ALLI of the AP and/or the location information of the macro cell exist. In this case, the stored ALLI of the AP is the preset stored ALLI of the AP, and the stored location information of the macro cell is the preset stored location information of the macro cell.

If neither the stored ALLI of the AP nor the location information of the macro cell exists, the process proceeds to S609.

In the embodiment of the present invention, if both the stored ALLI of the AP and the location information of the macro cell exist, the process proceeds to S607 to determine whether the stored ALLI of the AP to access the Internet is the same as the stored ALLI of the AP to access the Internet, and to determine whether the location information of the macro cell carried by the AP is the same as the stored location information of the macro cell. If the obtained ALLI is the same as the stored ALLI and the carried location information of the macro cell is the same as the stored location information of the macro cell, the process proceeds to S610. If at least one preceding case is different, the process proceeds to S622, and a message indicating that the authentication is not passed is returned to the AP. In the embodiment of the present invention, a different case refers to:

The obtained ALLI is different from the stored ALLI and the carried location information of the macro cell is the same as the stored location information of the macro cell;

the obtained ALLI is the same as the stored ALLI and the carried location information of the macro cell is different from the stored location information of the macro cell; or the obtained ALLI is different from the stored ALLI and the carried location information of the macro cell is different from the stored location information of the macro cell.

In the embodiment of the present invention, the S608 is proceeded. When only the stored ALLI of the AP exists, a determination is made about whether the obtained ALLI of the AP to access the Internet is the same as the stored ALLI of the AP to access the Internet. If the obtained ALLI is the same as the stored ALLI, the process proceeds to S609.

If, in S608, only the location information of the macro cell exists, a determination is made about whether the location information of the macro cell carried by the AP is the same as the stored location information of the macro cell. If the carried location information is the same as the stored location information, the process proceeds to S609. If the obtained ALLI is different from the stored ALLI, or the carried location information of the macro cell is different from the stored location information of the macro cell, the process proceeds to S622.

S609: The AP is bound with the location information of the macro cell and the obtained ALLI, and the location information and the ALLI are stored.

S610: The AHR sets the parameters of the AP according to the ALLI or the location information of the macro cell.

S612: The AHR returns the set parameters to the AP through a boot flow response message.

S614: The AP obtains the location information of the macro cell.

S616: The AP sends an access flow request message with the IP address of the public network of the AP which is located in the coverage of a macro cell, and the location information of the macro cell to the AHR for access authentication.

S618: The AHR queries the CLF according to the IP address of the public network sent by the AP to obtain the ALLI of the AP to access the Internet.

S620: A determination is made about whether the obtained ALLI of the AP to access the Internet is the same as the stored ALLI of the AP to access the Internet, and whether the location information of the macro cell carried by the AP is the same as the stored location information of the macro cell, that is, the location is verified.

S622: The AHR returns the authentication result to the AP through an access flow response message. In the embodiment of the present invention, if the AHR returns the result indicating that the authentication is passed to the AP, that is, the location of the AP is not changed, the AP runs continuously. If the AHR returns the result indicating that the authentication is not passed to the AP, that is, the location of the AP is changed, the AP stops working.

Figure 8A:
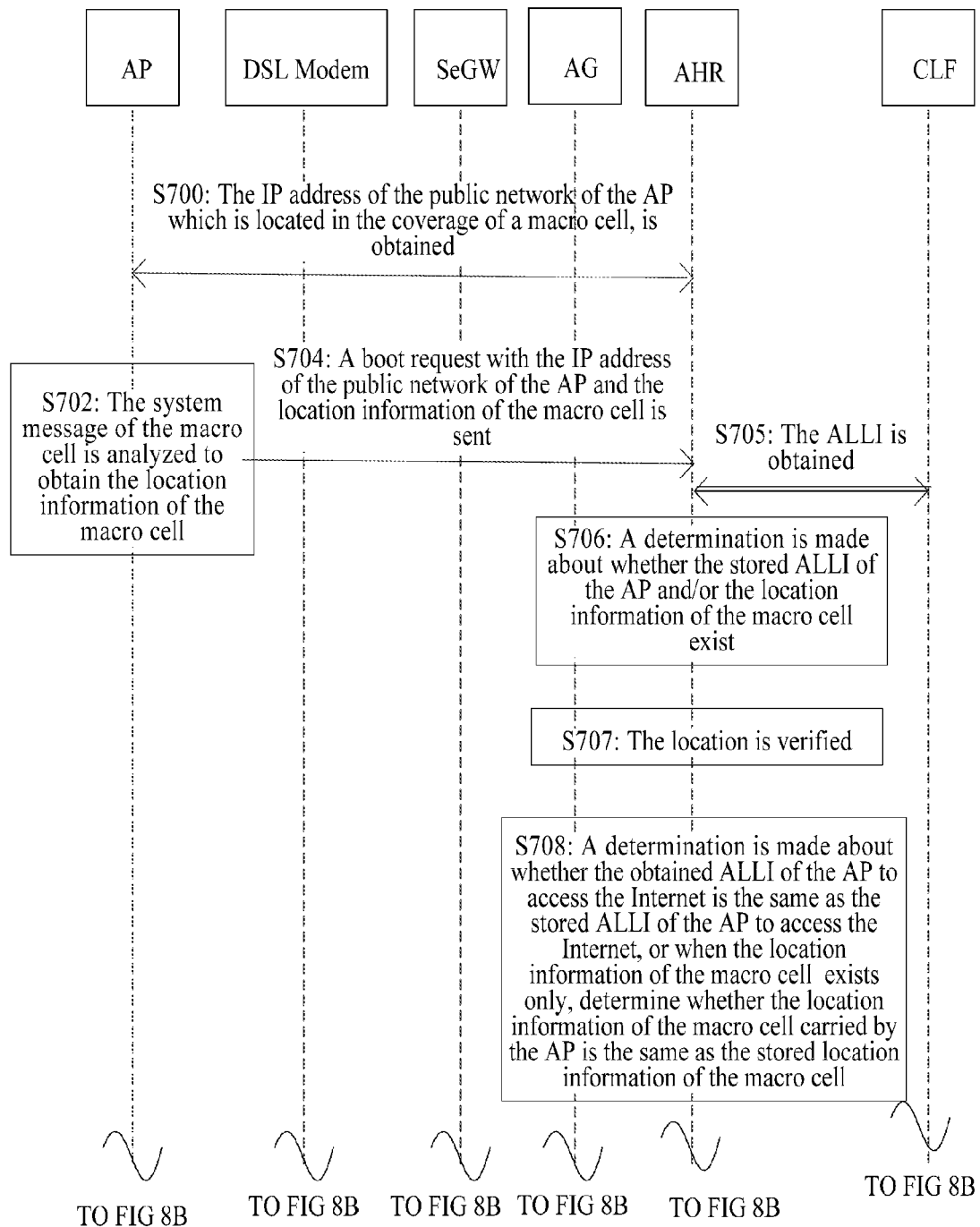
FIGS. 8A-8B are a flowchart of a specific application in the second scenario in the general flowchart shown in FIGS. 6A-6C.
Figure 8B:
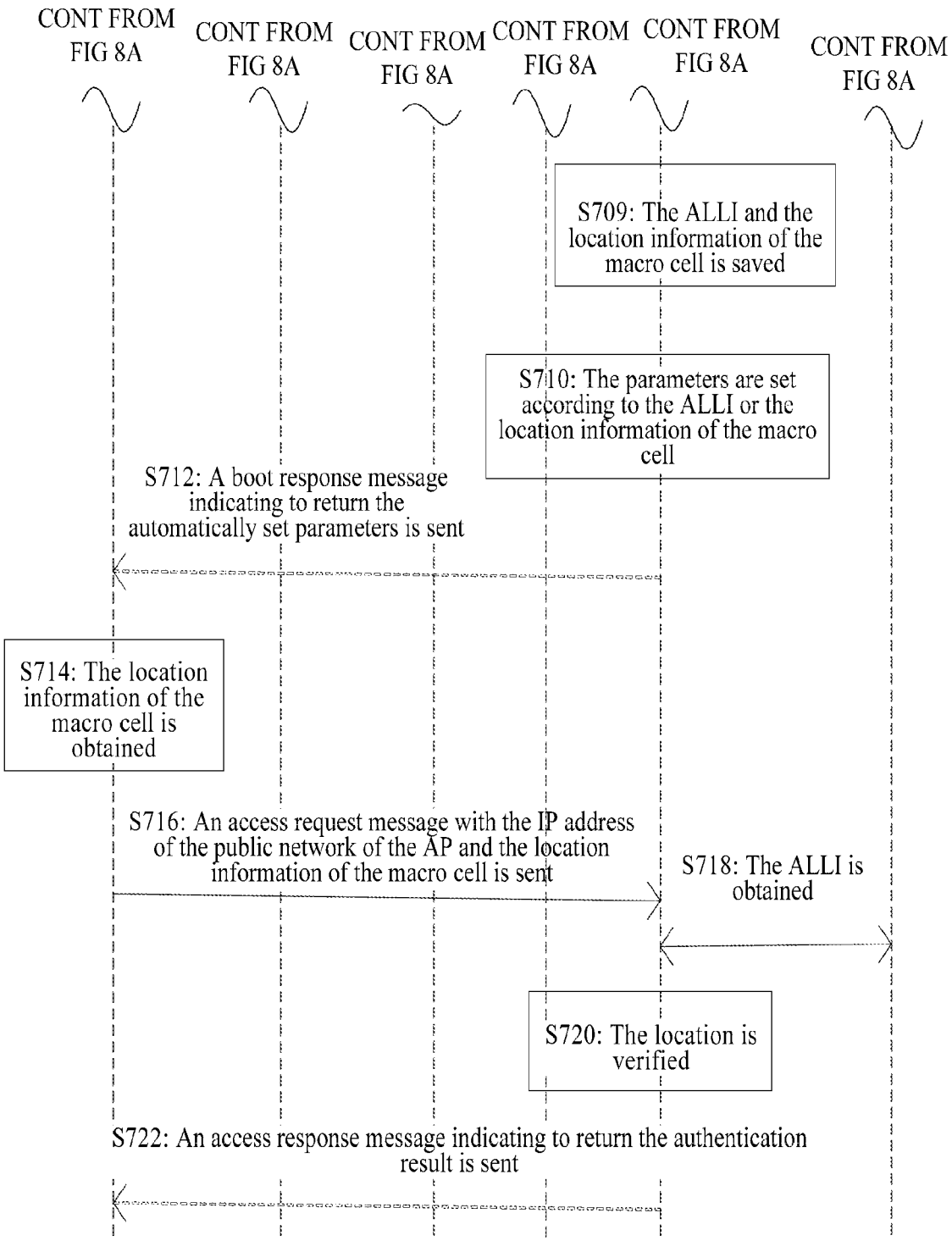

FIGS. 8A-8B are a flowchart of specific application in the second scenario in the general flowchart shown in FIGS. 6A-6C. In the embodiment of the present invention, the difference between FIGS. 8A-8B and FIGS. 7A-7B lies in the method for obtaining the IP address of the public network of the AP. That is, S700 in FIGS. 8A-8B is the same as S300 in FIG. 4, and S702 to S722 in FIGS. 8A-8B are the same as S602 to S622 in FIGS. 7A-7B. These steps are not described here.

Figure 9A:
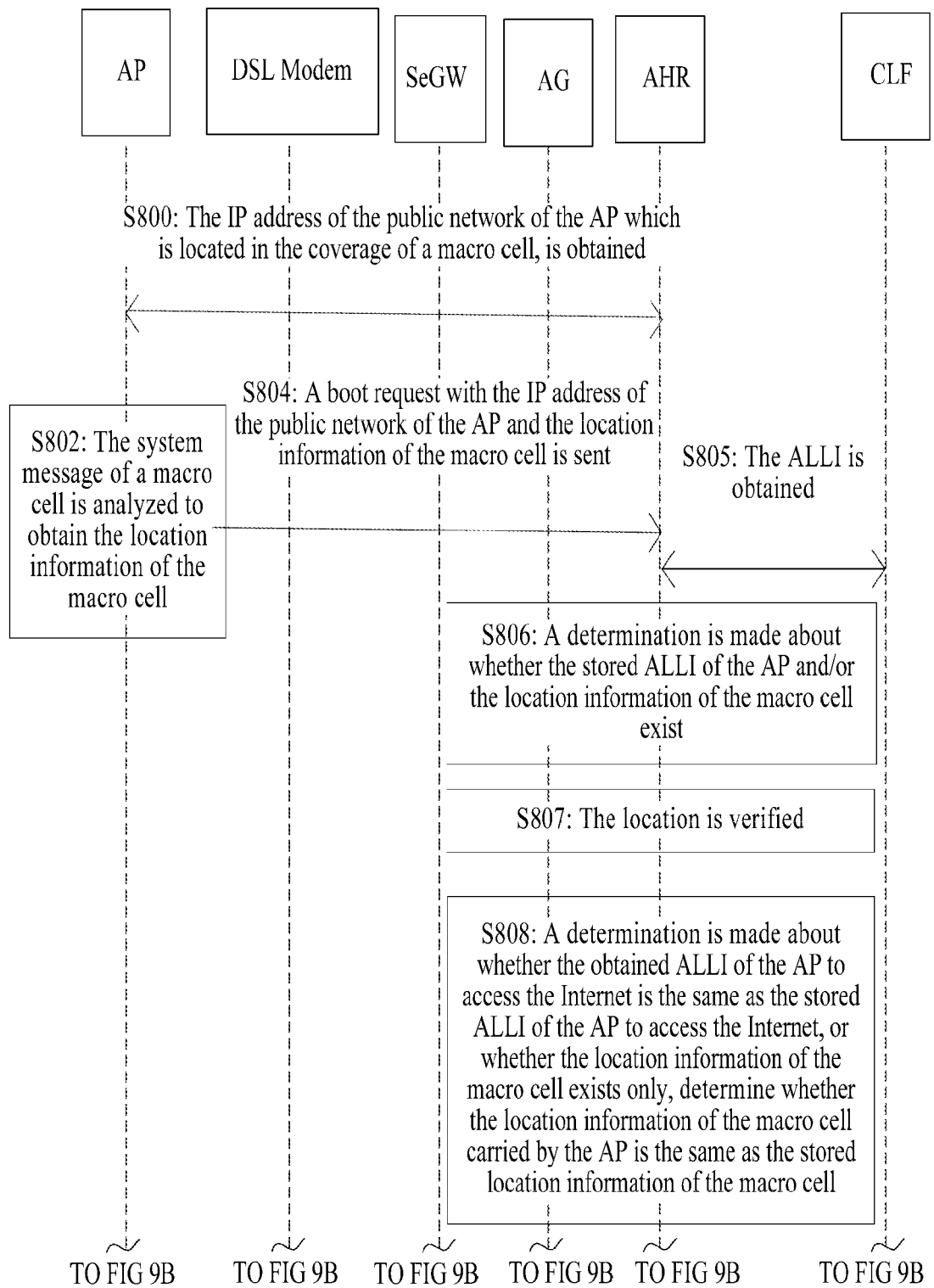
FIGS. 9A-9B are a flowchart of a specific application in the third scenario in the general flowchart shown in FIGS. 6A-6C.
Figure 9B:
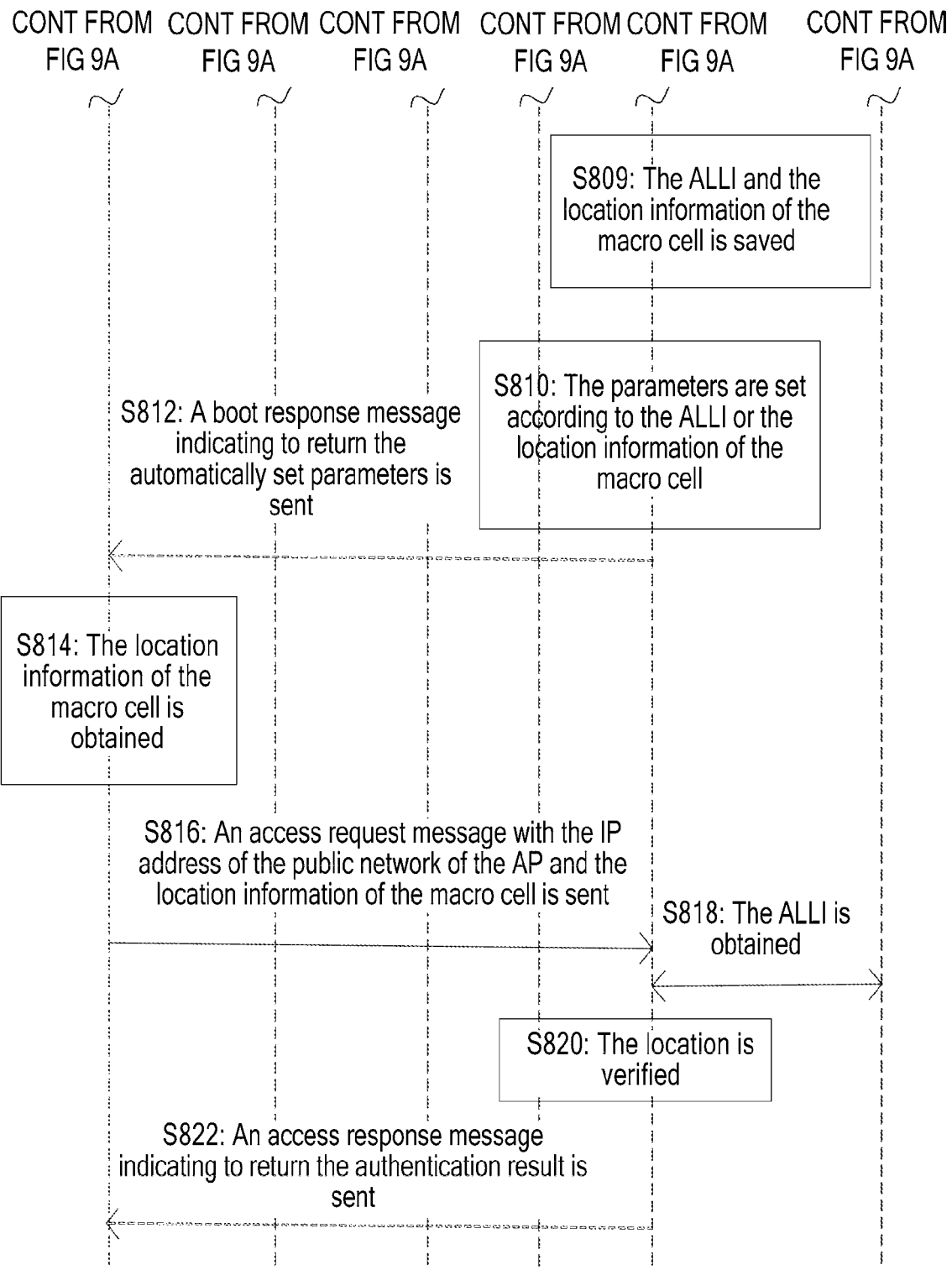

FIGS. 9A-9B are a flowchart of specific application in the third scenario in the general flowchart shown in FIGS. 6A-6C. In the embodiment of the present invention, the different between FIGS. 9A-9B and FIGS. 8A-8B lies in the method for obtaining the IP address of the public network of the AP. That is, S800 in FIGS. 9A-9B is the same as S400 in FIG. 5, and S802 to S822 in FIGS. 9A-9B are the same as S702 to S722 in FIGS. 8A-8B. These steps are not described here.

A location verification method of the AP which is located in the coverage of a macro cell is provided in the embodiment of the present invention to bind the AP with the location information of the macro cell and the ALLI of the AP to access the Internet and store the ALLI. Because the ALLI keeps unchanged, the location of the AP can be verified accurately by determining whether the ALLI related to the IP address of the public network of the AP is the same as the stored ALLI of the AP and determining whether the obtained location information of the macro cell is the same as the stored location information of the macro cell. The location of the AP can be verified more accurately in the embodiment 2 than in the embodiment 1, thus checking the validity of the AP location. For example, when the IP address of the AP is masqueraded, the IP address cannot be verified correctly in the embodiment 1. Because the location information of the macro cell is not changed, the location information of the AP can be verified more accurately in the embodiment 2 than in embodiment 1 by determining whether the location information of the macro cell obtained by the AP is the same as the stored location information of the macro cell.

Figure 10:
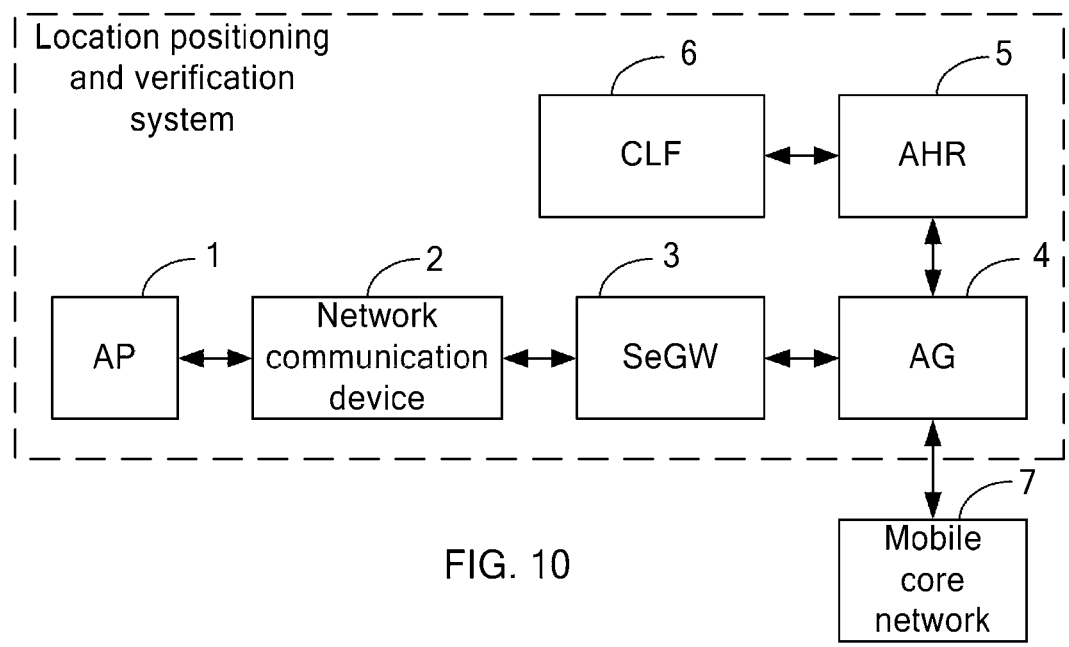
FIG. 10 is a schematic diagram of a location positioning and verification system according to an embodiment of the present disclosure.

FIG. 10 shows a location positioning and verification system in the embodiment of the present invention. In the embodiment of the present invention, a location positioning and verification system includes AP 1, network communication device 2, SeGW 3, AG 4, AHR 5, and CLF 6. AP 1 is connected to SeGW 3 through the network communication device 2, SeGW 3 is connected to AHR 5 through AG 4, and AHR 5 is connected to CLF 6. In the embodiment of the present invention, SeGW 3 is configured to obtain the source IP address from the IP header in a message sent by AP 1 when an IPSec tunnel is established with AP 1 and return the source IP address to AP 1. In the embodiment of the present invention, if the network communication device 2 is connected to the Internet in NAT mode, the source IP address is the IP address of the public network of the network communication device 2. Otherwise, the source IP address is the IP address of the public network of the AP. In the embodiment of the present invention, SeGW 3 can return the source IP address to AP 1 in the mode of carrying extendably the IP address in the vendor ID payload or the configuration payload.

In other embodiments, after the IP address of the public network of AP 1 to access the Internet through the network communication device 2 is obtained, SeGW 3 is configured to send the IP address of the public network to AHR 5 by sending an EAP-SIM or EAP-AKA authentication message. Then, AHR 5 returns the IP address to AP 1.

In other embodiments, after the IP address of the public network of AP 1 to access the Internet through the network communication device 2 is obtained, SeGW 3 is configured to send the IP address of the public network to AHR 5 by sending a DHCP request message for allocating the IP address of the Intranet. Then, AHR 5 returns the IP address to AP 1.

AHR 5 is configured to query CLF 6 according to the IP address of the public network of AP 1 to obtain the ALLI related to the IP address, verify the location of AP 1 according to the obtained ALLI and stored ALLI, and return the authentication result to AP 1.

Figure 11:
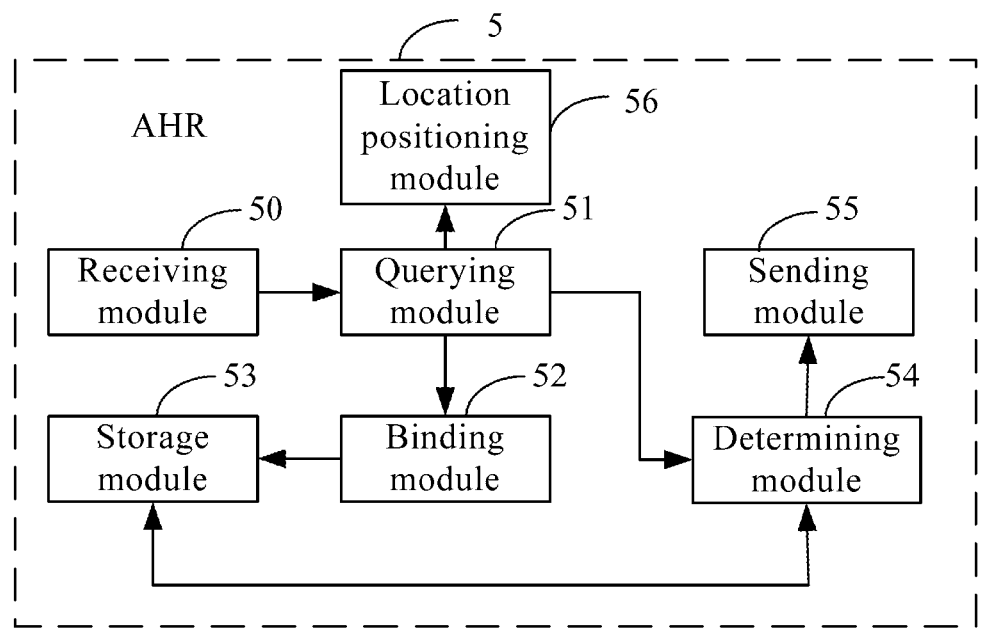
FIG. 11 is a schematic diagram of an AHR according to an embodiment of the present disclosure.

FIG. 11 is a schematic diagram of an AHR according to an embodiment of the present disclosure. In the embodiment of the present invention, AHR 5 includes a receiving module 50, a querying module 51, a binding module 52, a storage module 53, a determining module 54, a sending module 55, and a location positing module 56. In the embodiment of the present invention, the receiving module 50 is configured to receive a boot flow request message with the IP address of the public network of AP 1, and forward the IP address to the querying module 51.

The querying module 51 is configured to query CLF 6 according to the boot flow request message to obtain the ALLI of AP 1 to access the Internet, and send the ALLI to the determining module 54, binding module 52, and location positioning module 56.

The location positioning module 56 is configured to determine the location of the AP according to the ALLI of the AP to access the Internet. Because the ALLI keeps unchanged, the location of the AP to access the network each time can be located by obtaining the ALLI.

The determining module 54 is configured to query whether the preset stored ALLI of the AP exists in the storage module 53 through the querying module 51. If the preset stored ALLI exists, determine whether the ALLI of the AP sent by the querying module 51 is the same as the stored ALLI of the AP preset in the storage module 53. If the sent ALLI is different from the stored ALLI, that is, the location of the AP is changed, the sending module 55 returns the result indicating that the authentication is not passed to AP 1. If the sent ALLI is the same as the stored ALLI, the location of the AP is not changed.

If the determining module 54 determines that no stored ALLI of the AP is preset in the storage module 53 through the querying module 51, the determining module 54 notifies the binding module 52 of the case for binding the ALLI with AP 1, and stores the binding information in the storage module 53.

The receiving module 50 is configured to receive an access flow request message with the IP address of the public network of AP 1, and forward the IP address to the querying module 51 for querying the ALLI of the AP related to the IP address.

The determining module 54 is configured to determine whether the ALLI of the AP to access the Internet sent by the querying module 51 and the stored ALLI of the AP to access the Internet. In the embodiment of the present invention, if the sent ALLI is the same as the stored ALLI, that is, the location of the AP is not changed, the sending module 55 returns the result indicating that the authentication is passed to AP 1. If the sent ALLI is different from the stored ALLI, that is, the location of the AP is changed, the sending module 55 returns the result indicating that the authentication is not passed to AP 1.

A location positioning and verification system and an AHR provided in the embodiment of the present invention are configured to bind the AP with the ALLI of the AP to access the Internet. Because the ALLI keeps unchanged, the location of the AP to access the network can be located each time by obtaining the ALLI of the AP to access the Internet. Moreover, the location of the AP can be verified accurately by determining whether the ALLI related to the IP address of the public network of the AP is the same as the stored ALLI of the AP, thus checking the validity of the AP location. When the location of the AP is changed, the AP is prohibited to access the network, that is, the authentication is not passed, so that a user is restricted to move the AP freely.

In other embodiments, the receiving module 50 is configured to receive the location information, which is sent by AP 1, of the macro cell where AP 1 is located.

The determining module 54 is also configured to determine whether the preset stored location information of the macro cell exists in the storage module 53 through the querying module 51. In the storage module 53, if both the stored ALLI of the AP and the location information of the macro cell exist, the determining module 54 determines whether the obtained ALLI of the AP to access the Internet is the same as the stored ALLI of the AP to access the Internet, and determines whether the location information of the macro cell carried by the AP is the same as the stored location information of the macro cell. If at least one preceding case is different, that is, the location of the AP is changed, the sending module 55 returns the result indicating that the authentication is not passed to AP 1. Otherwise, the location of the AP is not changed. In the embodiment of the present invention, a different case refers to:

The obtained ALLI is different from the stored ALLI and the carried location information of the macro cell is the same as the stored location information of the macro cell;

the obtained ALLI is the same as the stored ALLI and the carried location information of the macro cell is different from the stored location information of the macro cell; or the obtained ALLI is different from the stored ALLI and the carried location information of the macro cell is different from the stored location information of the macro cell.

If the determining module 54 determines neither the preset stored ALLI of the AP nor the location information of the macro cell where AP 1 is located exists in the storage module 53 through the querying module 51, the determining module 54 notifies the binding module 52 of binding AP 1 with the location information of the macro cell where AP 1 is located and the ALLI related to the AP, and the location information and the ALLI are stored in the storage module 53.

When only the ALLI of the AP is stored in the storage module 53, the determining module 54 determines whether the obtained ALLI of the AP to access the Internet is the same as the stored ALLI of the AP to access the Internet through the querying module 51. If the obtained ALLI is the same as the stored ALLI, the determining module 54 notifies the binding module 52 of binding AP 1 with the location information of the macro cell where AP 1 is located and the ALLI related to the AP, and the location information and the ALLI are stored in the storage module 53.

Or, when the location information of the macro cell exists only, the determining module 54 determines whether the location information of the macro cell carried by the AP is the same as the stored location information of the macro cell. If the carried location information is the same as the stored location information, the determining module 54 notifies the binding module 52 of binding AP 1 with the location information of the macro cell where AP 1 is located and the ALLI related to the AP, and the location information and the ALLI are stored in the storage module 53.

If the obtained ALLI is different from the stored ALLI, or the carried location information of the macro cell is different from the stored location information of the macro cell, the determining module 54 returns the result indicating that the authentication is not passed to AP 1 through the sending module 55.

The receiving module 50 is also configured to receive an access flow request message with the IP address of the public network of AP 1 which is located in the coverage of a macro cell, and the location information of the macro cell, and forward the IP address and location information to the querying module 51 for querying the ALLI of the AP related to the IP address.

The determining module 54 is also configured to determine whether the ALLI, which is sent by the querying module 51, of the AP to access the Internet is the same as the stored ALLI of the AP to access the Internet, and whether the location information of the macro cell is the same as the stored location information of the macro cell. In other embodiments, if the sent ALLI is the same as the stored ALLI and the location information is the same as the stored location information, that is, the location of the AP is not changed, the sending module 55 returns the result indicating that the authentication is passed to AP 1. If at least one preceding case is different, that is, the location of the AP is changed, the sending module 55 returns the result indicating that the authentication is not passed to AP 2.

In other embodiments, when the IP address of the AP is masqueraded, the location information of the AP which is located in the coverage of a macro cell, can be verified correctly by determining whether the location information of the macro cell obtained by the AP is the same as the stored location information of the macro cell because the location information of the macro cell keeps unchanged.

The common technicians in the field can understand and implement all or part procedures of the methods in the preceding embodiment. The methods can be achieved by a computer program through guiding related hardware, and the procedures described can be stored in a computer readable storage medium. Therefore, when the program is implemented, it involves the procedures of methods in the forgoing embodiment. By the way, the described storage medium can be a disk, CD, Read-Only Memory (ROM) or Random Access Memory (RAM).

At last, note that the preceding embodiment is only configured to describe the technical solutions in the present invention and not configured to limit the technical solutions. Although the present invention is described in detail by referring to good embodiments, the common technicians in the field should understand that technical solutions in the present invention can still be modified or replaced without departing from the spirit and scope of the invention.

What is claimed is:

1. A method of location verification of an Access Point (AP) comprising:
   receiving a message carrying an IP address of the AP which is located in a coverage of a macro cell, and location information of the macro cell;
   querying, according to the IP address of the AP, a Connectivity Session Location and Repository Function (CLF) to obtain an access Line Location Identifier (ALLI) of the AP;
   determining whether a stored ALLI of the AP and stored location information of the macro cell exist;
   if the stored ALLI of the AP and the stored location information of the macro cell exist, determining that a location of the AP is not changed if the obtained ALLI of the AP is same as the stored ALLI of the AP, and the location information of the macro cell carried in the received message is same as the stored location information of the macro cell; and
   if the stored ALLI of the AP exists and the stored location information of the macro cell does not exist, determining whether the obtained ALLI of the AP is same as the stored ALLI of the AP; and determining that a location of the AP is changed if the obtained ALLI of the AP is different from the stored ALLI of the AP.

2. The method according to claim 1, further comprising:
   storing a preset ALLI of the AP and a preset location information of the macro cell.

3. The method according to claim 1, wherein the stored ALLI of the AP and the stored location information of the macro cell are stored by:
   receiving, from the AP which is located in a coverage of a macro cell, a boot flow request message which carries an IP address of the AP and location information of the macro cell;
   querying, according to the IP address of the AP carried in the boot flow request message, the CLF to obtain the ALLI of the AP; and
   binding and storing the ALLI of the AP obtained based upon the boot flow message with information of the AP, and the location information of the macro cell carried in the received boot flow request message, if neither the stored ALLI of the AP nor the stored location information of the macro cell exist.

4. The method according to claim 3, wherein after the determining whether a stored ALLI of the AP and stored location information of the macro cell exist, the method further comprises:
   determining whether the location information of the macro cell carried in the received message is same as the stored location information of the macro cell if the stored location information of the macro cell exists and the ALLI of the AP does not exist; and
   determining that a location of the AP is changed if the location information of the macro cell carried in the received message is different from the stored location information of the macro cell.

5. The method according to claim 3, wherein after the determining whether a stored ALLI of the AP and stored location information of the macro cell exist, the method further comprises:
binding and storing the ALLI of the AP with the information of the AP, the location information of the macro cell, if the obtained ALLI of the AP is same as the stored ALLI of the AP, or the location information of the macro cell carried in the received message is same as the stored location information of the macro cell.

6. The method according to claim 4, wherein after the determining whether a stored ALLI of the AP and/or stored location information of the macro cell exist, the method further comprises:
binding and storing the ALLI of the AP with the information of the AP, the location information of the macro cell, if the obtained ALLI of the AP is same as the stored ALLI of the AP, or the location information of the macro cell carried in the received message is same as the stored location information of the macro cell.

7. The method according to claim 1, further comprising:
determining that a location of the AP is changed:
if the obtained ALLI of the AP is different from the stored ALLI of the AP, and the received location information of the macro cell carried in the received message is same as the stored location information of the macro cell; or
if the obtained ALLI of the AP is same as the stored ALLI of the AP and the location information of the macro cell carried in the received message is different from the stored location information of the macro cell; or
if the obtained ALLI of the AP is different from the stored ALLI of the AP and the location information of the macro cell carried in the received message is different from the stored location information of the macro cell.

8. The method according to claim 1, further comprising:
receiving an Extensible Authentication Protocol-Subscriber Identity Module (EAP-SIM) or Extensible Authentication Protocol-Authentication and Key Agreement (EAP-AKA) authentication message which carries the IP address of the AP; and returning the IP address to the AP; or receiving a Dynamic Host Configuration Protocol (DHCP) request message for allocating the IP address of the Intranet which carries the IP address of the AP; and returning the IP address to the AP.

9. An Access Point Home Register (AHR), comprising:
a receiving module, configured to receive a message carrying an IP address of the AP which is located in a coverage of a macro cell and location information of the macro cell;
a querying module, configured to query, according to the IP address of the AP, a Connectivity Session Location and Repository Function (CLF) to obtain an access Line Location Identifier (ALLI) of the AP; wherein the querying module is further configured to query whether a stored ALLI of the AP and stored location information of the macro cell exist in a storage module;
a determining module, configured to determine whether the obtained ALLI of the AP is same as the stored ALLI of the AP, and whether the location information of the macro cell carried in the received message is same as the stored location information of the macro cell, if a query result of the querying module indicates that the stored ALLI of the AP and the stored location information of the macro cell exist in the storage module;

a sending module, configured to return to the AP a result that a location of the AP is not changed, if the determining module determines that the obtained ALLI is same as the stored ALLI and the received location information is same as the stored location information;
wherein the determining module is further configured to determine whether the obtained ALLI of the AP is same as the stored ALLI of the AP if the stored ALLI of the AP exists and the stored location information of the macro cell does not exist; and
the sending module is further configured to return to the AP a result that a location of the AP is changed, if the determining module determines that the obtained ALLI of the AP is different from the stored ALLI of the AP.

10. The AHR according to claim 9, wherein the querying module is further configured to query, according to an IP address carried in a boot flow request message received from the AP located in a coverage of a macro cell, the CLF to obtain the ALLI of the AP, wherein the boot flow request message carries the IP address of the AP and location information of the macro cell.

11. The AHR according to claim 10, further comprising:
the storage module, configured to store, a preset ALLI of the AP and a preset location information of the macro cell;
a binding module, configured to bind the ALLI of the AP obtained based upon the boot flow request message by the querying module with information of the AP, and the location information of the macro cell carried in the received boot flow request message, if a query result of the querying module query indicates that the stored ALLI of the AP does not exist and the stored location information of the macro cell does not exist in the storage module;
wherein the storage module is further configured to store the ALLI of the AP, the information of the AP and the location information of the macro cell bound by the binding module.

12. The AHR according to claim 11, wherein the determining module is further configured to determine whether the received location information of the macro cell is same as the stored location information of the macro cell if the stored location information of the macro cell exists and the ALLI of the AP does not exist; and
the sending module is further configured to return to the AP a result that the location of the AP is changed, if the determining module determines that the received location information of the macro cell is different from the stored location information of the macro cell.

13. The AHR according to claim 11, wherein the binding module is further configured to bind the ALLI of the AP with the information of the AP, the location information of the macro cell, if the determining module determines that the obtained ALLI of the AP is same as the stored ALLI of the AP, or the received location information of the macro cell is same as the stored location information of the macro cell.

14. The AHR according to claim 12, wherein the binding module is further configured to bind the ALLI of the AP with the information of the AP, the location information of the macro cell, if the determining module determines that the obtained ALLI of the AP is same as the stored ALLI of the AP, or the received location information of the macro cell is same as the stored location information of the macro cell.

15. The AHR according to claim 9, wherein the sending module is further configured to return to the AP a result that the location of the AP is changed, if the determining module determines that the obtained ALLI of the AP is different from the stored ALLI of the AP, and the received location information of the macro cell is same as the stored location information of the macro cell; or that the obtained ALLI of the AP is same as the stored ALLI of the AP and the received location information of the macro cell is different from the stored location information of the macro cell; or that the obtained ALLI of the AP is different from the stored ALLI of the AP and the received location information of the macro cell is different from the stored location information of the macro cell.

16. A location verification system, comprising:

an Access Point (AP), a network communication device, a Security Gateway (SeGW), an Access Gateway (AG), an Access Point Home Register (AHR), and a Connectivity Session Location and Repository Function (CLF);

wherein the AP is connected communicatively to the SeGW through the network communication device, the SeGW is connected communicatively to the AHR through the AG, and the AHR is connected communicatively to the CLF; and the AHR is configured to query, according to an IP address carried in a received message, the CLF to obtain an access Line Location Identifier (ALLI) of the AP which is located in a coverage of a macro cell, and determine whether a stored ALLI of the AP and stored location information of the macro cell exist;

if the stored ALLI of the AP and the stored location information of the macro cell exist, determine whether the obtained ALLI of the AP is same as the stored ALLI of the AP, and the location information of the macro cell carried in the received message is same as the stored location information of the macro cell;

if the stored ALLI of the AP exists and the stored location information of the macro cell does not exist, determine whether the obtained ALLI of the AP is same as the stored ALLI of the AP and return to the AP a result that the location of the AP is not changed, if the obtained ALLI of the AP is same as the stored ALLI of the AP, and the location information of the macro cell carried in the received message is same as the stored location information of the macro cell, and return to the AP a result that the location of the AP is changed, if the obtained ALLI of the AP is different from the stored ALLI of the AP.

17. The location verification system according to claim 16, wherein the AHR is further configured to return to the AP a result that the location of the AP is changed, if it is determined that the obtained ALLI of the AP is different from the stored ALLI of the AP, and the received location information of the macro cell is same as the stored location information of the macro cell; or if it is determined that the obtained ALLI of the AP is same as the stored ALLI of the AP and the received location information of the macro cell is different from the stored location information of the macro cell; or if it is determined that the obtained ALLI of the AP is different from the stored ALLI of the AP and the received location information of the macro cell is different from the stored location information of the macro cell.

18. A non-transitory computer-readable medium having computer executable instructions for performing a method comprising:

receiving a message carrying an IP address of the AP which is located in a coverage of a macrocell, and location information of the macro cell;

querying, according to the IP address of the AP a Connectivity Session Location and Repository Function (CLF) to obtain an access Line Location Identifier (ALLI) of the AP;

determining whether a stored ALLI of the AP and stored location information of the macro cell exist;

if the stored ALLI of the AP and the stored location information of the macro cell exist, determining that a location of the AP is not changed if the obtained ALLI of the AP is same as the stored ALLI of the AP, and the location information of the macro cell carried in the received message is same as the stored location information of the macro cell; and if the stored ALLI of the AP exists and the stored location information of the macro cell does not exist, determining whether the obtained ALLI of the AP is same as the stored ALLI of the AP; and determining that a location of the AP is changed if the obtained ALLI of the AP is different from the stored ALLI of the AP.

* * * * *